(12) United States Patent
Hunckler et al.

(10) Patent No.: US 8,387,676 B2
(45) Date of Patent: Mar. 5, 2013

(54) SHADE AND SHADING SYSTEM

(76) Inventors: Roger Hunckler, Mocksville, NC (US);
Clare A. Hunckler, Mocksville, NC (US)

(*) Notice: Subject to any disclaimer, the term of this patent is extended or adjusted under 35 U.S.C. 154(b) by 148 days.

(21) Appl. No.: 12/843,972

(22) Filed: Jul. 27, 2010

(65) Prior Publication Data
US 2011/0017413 A1    Jan. 27, 2011

Related U.S. Application Data

(60) Provisional application No. 61/271,804, filed on Jul. 27, 2009.

(51) Int. Cl.
*B60J 11/08* (2006.01)
(52) U.S. Cl. .................. 160/370.21; 160/105; 160/405; 160/DIG. 16
(58) Field of Classification Search ............ 160/370.21, 160/DIG. 16, 105, 327, 328, 354, 405; 150/168, 150/166; 296/95.1, 138–145, 97.1–97.9
See application file for complete search history.

(56) References Cited

U.S. PATENT DOCUMENTS

| | | | | |
|---|---|---|---|---|
| 3,263,736 A | * | 8/1966 | Macomson | 160/370.21 |
| 3,679,505 A | * | 7/1972 | Hinderaker et al. | 156/71 |
| 3,805,872 A | * | 4/1974 | Lorber | 160/354 |
| 4,351,557 A | * | 9/1982 | Chary | 296/97.7 |
| 4,560,245 A | * | 12/1985 | Sarver | 296/138 |
| 4,652,039 A | | 3/1987 | Richards | |
| 4,736,980 A | | 4/1988 | Eubanks | |
| 4,759,581 A | | 7/1988 | McNamee | |
| 4,779,918 A | | 10/1988 | McNamee | |
| 4,823,859 A | | 4/1989 | Park | |
| 4,929,014 A | | 5/1990 | Clark et al. | |
| D309,885 S | | 8/1990 | Gurruchaga | |
| 5,090,469 A | * | 2/1992 | Boulanger | 160/368.1 |
| 5,454,615 A | * | 10/1995 | Schnepf | 296/95.1 |
| 5,456,515 A | | 10/1995 | Dang | |
| 5,553,908 A | | 9/1996 | Shink | |
| 5,575,524 A | | 11/1996 | Cronk | |
| 5,762,393 A | | 6/1998 | Darmas | |
| 5,782,284 A | | 7/1998 | Leatherman | |
| 6,015,180 A | | 1/2000 | Beuerle | |
| 6,039,107 A | | 3/2000 | Pittard | |
| 6,135,191 A | * | 10/2000 | Mitchell et al. | 160/370.21 |
| 6,679,311 B2 | | 1/2004 | Aguilar | |

* cited by examiner

*Primary Examiner* — David Purol
(74) *Attorney, Agent, or Firm* — Womble Carlyle Sandridge & Rice LLP

(57) ABSTRACT

A shading system for a window comprising a panel having a shape and size that covers at least a portion of the window when the panel is placed over the window. The shading system may include a first plurality of magnets in the panel and a second plurality of magnets for securement to the inside surface of the window. The first and second plurality of magnets removably securing the panel over the window of the vehicle.

2 Claims, 9 Drawing Sheets

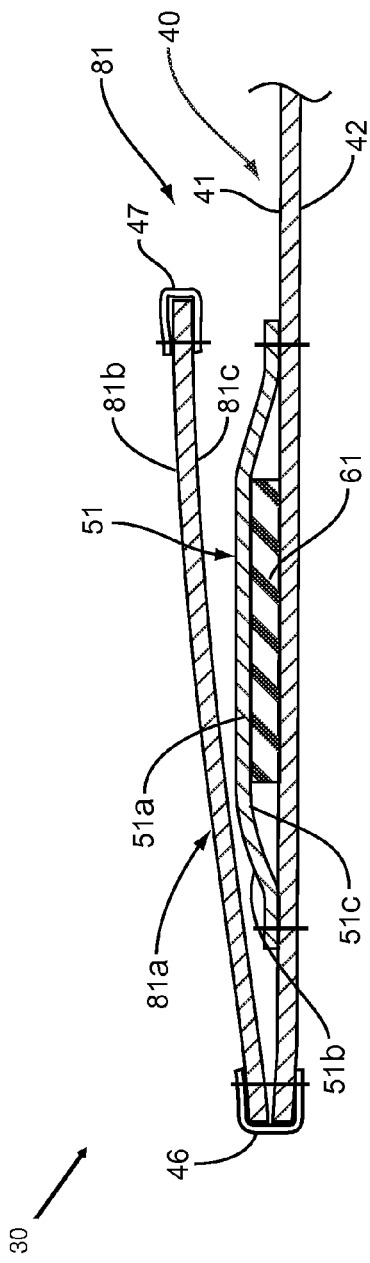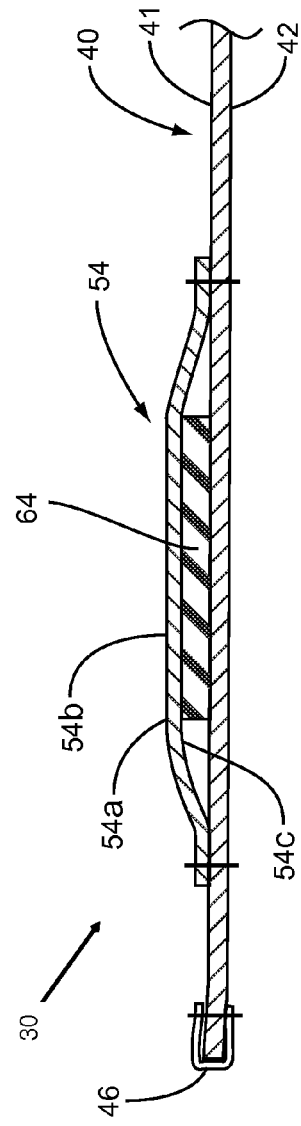

SHADE AND SHADING SYSTEM

CROSS REFERENCE TO RELATED APPLICATIONS

This application claims the benefit of U.S. Provisional Application No. 61/271,804 filed Jul. 27, 2009, the entirety of which is herein incorporated by reference.

FIELD OF THE INVENTION

The present invention relates to a shade and shading system, and to a method of making and using same.

BACKGROUND OF THE INVENTION

Sun shades have been used to block a certain amount of solar heat from entering the structure to which they are applied, thus helping to cool the interior of the structure. For example, shades have been used on automobile and motor home windshields while the vehicle is parked.

Anchoring a sun shade to a window has been attempted. Straps, suction cups, VELCRO brand fasteners, or metal snap and screw combinations have been used as ways to secure a shade in position on a window. These attempts, however, have drawbacks, such as cumbersome installation and risk of injury when using the shade on elevated windows, e.g., RV windshields. Further, the shades are not aesthetically pleasing.

In the above examples, the user must install fasteners in the cap around the windshield of the vehicle. A user must then use a ladder each time he or she installs or removes the shade while making sure that each mechanical fastener is secured so that the shade will remain stable. This is not only time consuming and tedious, but also exposes the installer to unnecessary danger. Another design uses aluminum poles sewn into each end so the shade can be unrolled across the windshield from the ground. Such a design requires adjustable straps attached to the side window frames with hooks or suction cups.

There is a need, therefore, for a shading system that overcomes disadvantages associated with known shading systems.

BRIEF DESCRIPTION OF THE DRAWINGS

FIG. 4 shows a cross-section of a portion of an exemplary shade taken along lines IV-IV in FIG. 3.

FIG. 5 shows a cross-section of another portion of the exemplary shade taken along lines V-V in FIG. 3.

DETAILED DESCRIPTION

Figure 1:
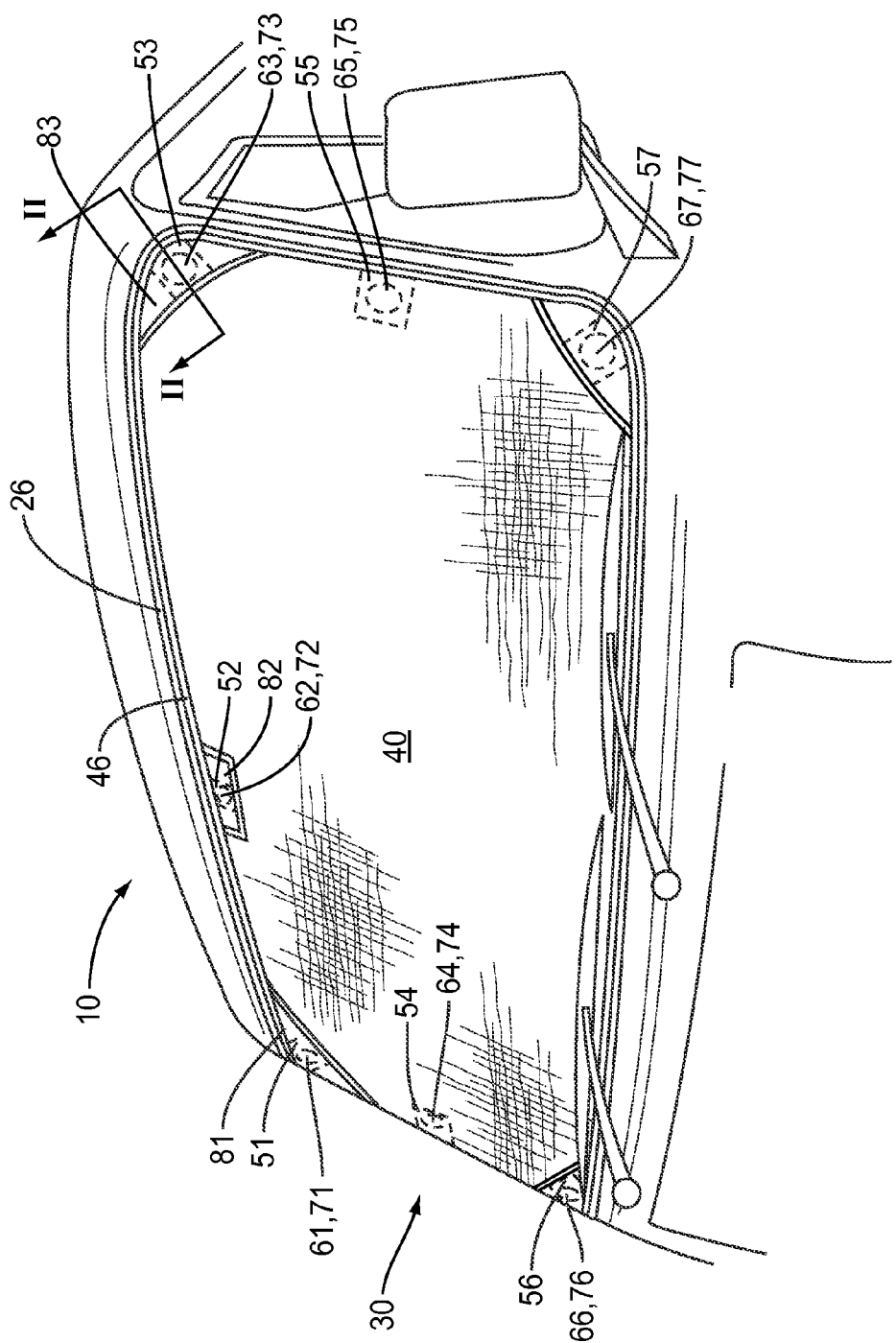
FIG. 1 is a perspective view of a shade installed on a window.

Certain exemplary embodiments of the present invention are described below and illustrated in the accompanying figures. The embodiments described are only for purposes of illustrating the present invention and should not be interpreted as limiting the scope of the invention, which, of course, is limited only by the claims below. Other embodiments of the invention, and certain modifications and improvements of the described embodiments, will occur to those skilled in the art and all such alternate embodiments, modifications, and improvements are within the scope of the present invention.

According to common practice, the various features of the drawings discussed below are not necessarily drawn to scale. Dimensions of various features and elements in the drawings may be expanded or reduced to more clearly illustrate the embodiments of the invention.

Figure 2:
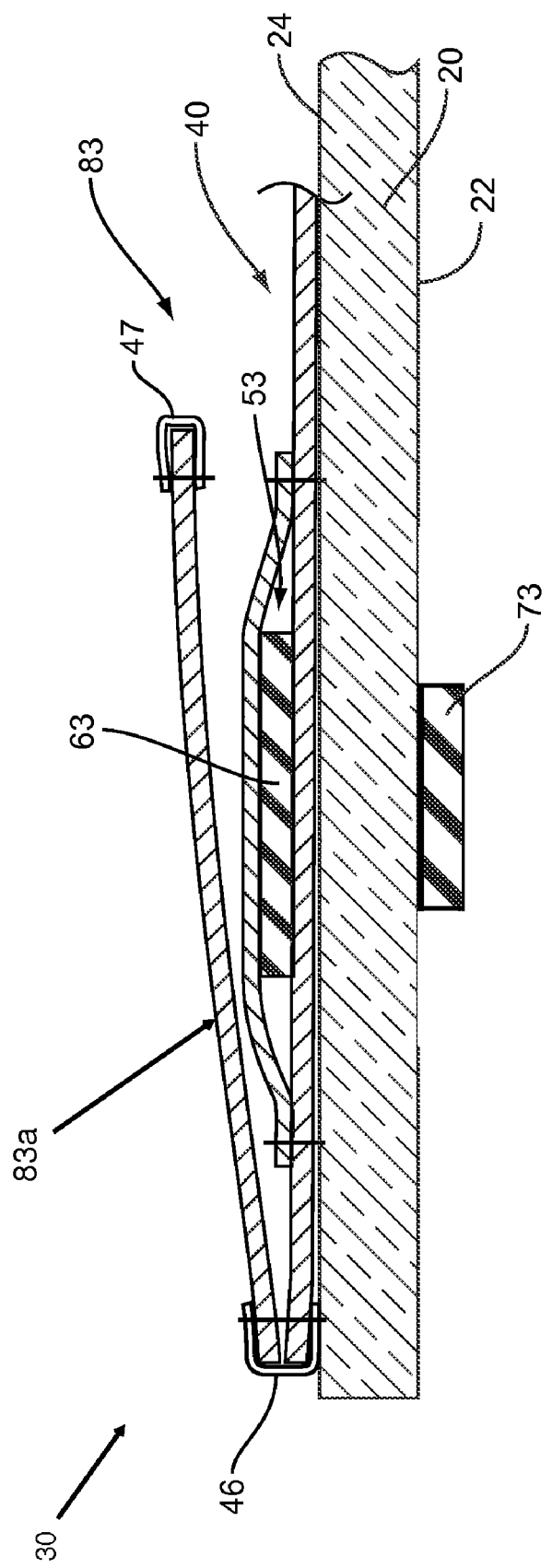
FIG. 2 shows a cross-section of a corner of the window with the shade thereon taken along lines II-II in FIG. 1.

FIGS. 1 and 2 illustrate an embodiment of a shade 30 removably secured to a window 20 of a vehicle 10. While a recreational vehicle is shown in FIG. 1, the shading system 30 as described herein is not limited to vehicles and may be utilized with any window or substrate where shading is desirable or needed.

Continuing with FIGS. 1 and 2, the shading system or shade 30 may have a panel 40 with a plurality of magnet sets. Each magnet set may include a first magnet 61, 62, 63, 64, 65, 66 and 67 and a second magnet 71, 72, 73, 74, 75, 76 and 77. In an embodiment, the first magnets 61, 62, 63, 64, 65, 66 and 67 in the set are located in the plurality of pockets 51, 52, 53, 54, 55, 56 and 57, respectively. The first magnets (and pockets) are positioned on the panel 40 to correspond to the locations of the second magnets which are secured to the inside surface of a window 20. In alternate embodiments, the second magnets may be located on the outside surface of the window. When the shade 30 is placed over the window 20, the first magnets attract to the second (window) magnets located on the opposite surface of the window 20. While six magnet sets are shown in the panel 40 and on the window 20, the shade 30 may have fewer or more magnet sets depending on the size and type of window.

In other alternate embodiments, the panel of the shading system may include a plurality of metallic members, or inserts (not shown) capable of magnetic attraction to the magnets. The inserts may be any ferromagnetic materials, e.g., iron or iron containing alloys. The inserts are placed in the panel pockets and are attracted to the plurality of magnets secured to the inside surface of the window. Alternatively, the metallic inserts may be secured to or embedded in the window. In such an embodiment, the plurality of magnets in the panel attract to the inserts located on the opposite surface of the window to removably secure the shade to the window.

Figure 6:
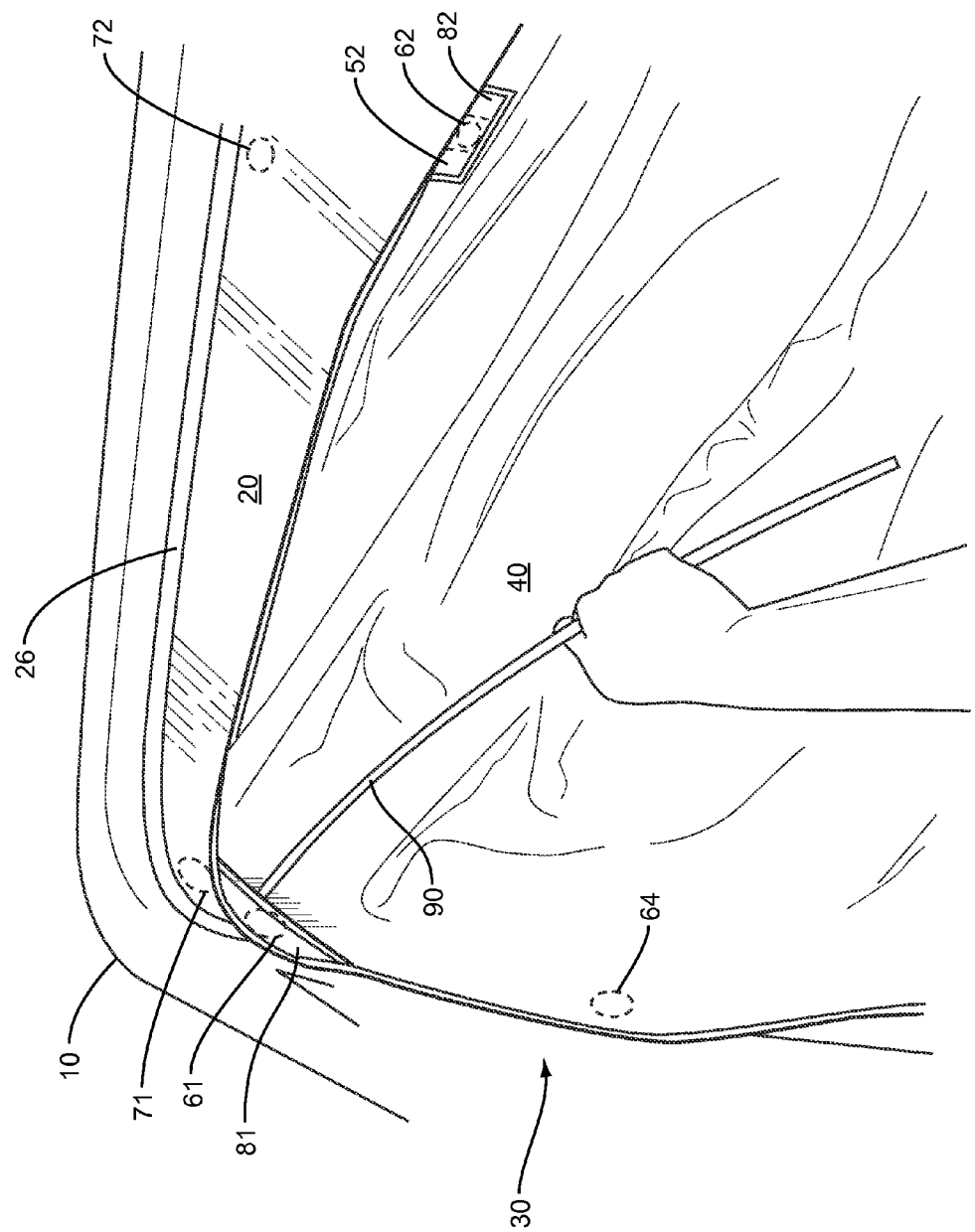
FIG. 6 shows how a shade is positioned on a window.

Continuing with FIGS. 1 and 2, the shade 30 may also include a plurality of open pockets 81, 82 and 83 positioned across the upper portion of the shade 30 that assist in installing and/or removing the shade 30 from the window 20, as will be discussed in more detail below. The open pockets receive the terminal end of rod 90 (shown in FIGS. 6-8). The rod may be fiberglass or any suitable material. While three open pockets are shown, the shade 30 may have fewer or more open pockets depending on the size and type of window.

Turning now to FIG. 2, a cross-section of a corner of the shade 30 installed on the window 20 is shown. The panel 40 lies adjacent the outside surface 24 of the window 20. As can be seen in FIG. 2, the panel 40 has a first magnet 63 inside the magnet pocket 53. The open pocket 83, also referred to herein as an installation pocket, is formed by a flap 83a being secured to the panel 40 at the binding hem 46.

The second magnet 73 is secured to the inside surface 22 of the window 20 and shown opposite the location of the first magnet 63. The second magnets may be secured to the window using an adhesive (not shown). In an embodiment, the adhesive is a room-temperature-vulcanizing (RTV) silicone, which, upon cure, mounts the second magnet to the window 20. In other embodiments, the second magnet is mounted to the window using a pressure sensitive adhesive.

Figure 3:
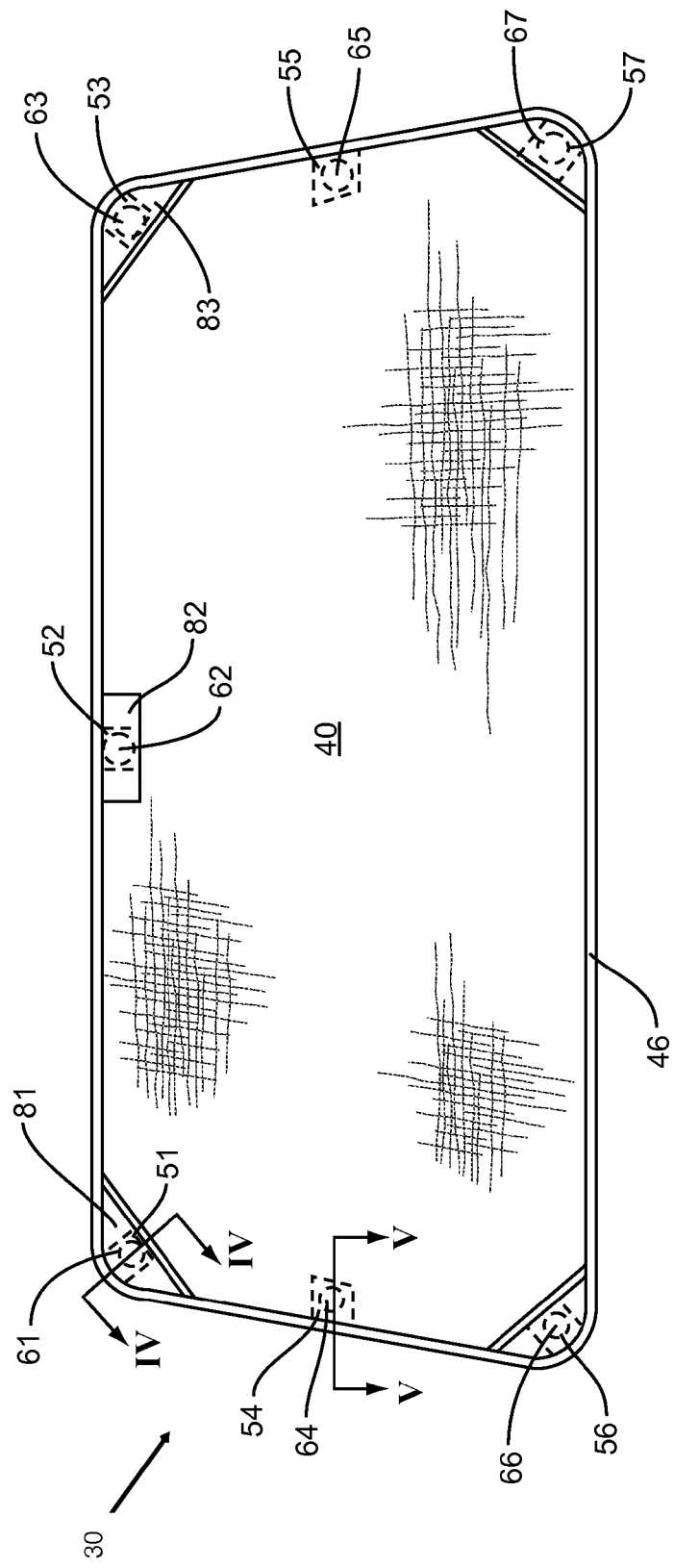
FIG. 3 shows a top view of an exemplary shade.

Turning now to FIG. 3, an exemplary shade 30 is shown. The shade panel 40 has a size and shape similar to that of the window (not shown). In alternate embodiments, the panel 40 may be sized to cover a window, e.g., the panel 40 overlaps the outer edges of the window 20. In other alternate embodiments, the panel 40 is sized to cover a window 20 and overlap a portion of the window edge, similar to the embodiment shown in FIG. 10 and discussed below.

Continuing with FIG. 3, the panel 40 has a plurality of pockets 51, 52, 53, 54, 55, 56 and 57 (with magnets 61-67 located therein) selectively positioned at locations on the panel 40 that correspond to the locations of the installed magnets 71, 72, 73, 74, 75, 76, and 77 (not shown in FIG. 3). In an embodiment, the plurality of pockets are located proximate the perimeter of the panel 40. In other embodiments, one or more of the plurality of pockets may be at any location on the panel 40 that assist in removably securing the shade 30 to the window 20 as needed. For example, one more of the plurality of pockets may be in a location substantially within the perimeter of the panel 40. In alternate embodiments, however, the number and location of pockets may vary with the number of magnet sets used in the shade 30.

Pockets located in the corner of the shade 30 may have an orientation or position that facilitates the manufacture and transport of the shade 30. The plurality of pockets in the corners, for example, pockets 51, 53, 56 and 57, may have a rectangular shape with its length oriented towards the corner of the panel 40. This orientation may minimize the magnet flipping when the shade 30 is rolled up and stored. Further, the pocket may be sized to fit around the magnet located in that pocket, which may minimize magnet flipping within the pockets as the shade 30 is rolled and stored.

Turning now to FIG. 4, a cross-section of the exemplary shade 30 is shown. As can be seen, the first pocket 51 includes a pocket panel 51*a* secured to the panel 40 and a magnet 61 is located in the pocket 51 on the panel surface 41. Above and at least partially covering the magnet pocket 51 is the open pocket flap 81*a* that forms the open installation pocket 81. A hem or binding 46 secures the open pocket panel 81*a* to the panel 40. The binding 46 and 47 may be biased outdoor woven fabric sewn onto the panel 40 together with a heavy duty marine thread.

As shown in FIGS. 4 and 5, the panel 40 is a single layer panel. In other alternate embodiments, however, the panel 40 may be comprised of one or more layers of a substrate. For example, in one embodiment, a panel 40 may comprise two layers of a substrate. In such an embodiment, the second layer of the panel covers entirely the magnet pocket 51. In such an embodiment, the flap 81*a* is secured to both the first and second layers of the panel at the binding 46. Further, in other embodiments, the open pocket flap 81*a* may include two or more layers of a substrate.

An exemplary panel is formed of a material that is flexible and is capable of blocking some solar heat from entering the structure on which the shade is placed. One exemplary panel is a woven fabric, such as woven polyester with a polyvinyl chloride (PVC) coating. However, other types of fabrics, or any other flexible substrate may be used.

FIGS. 3 and 5 show another type of exemplary pocket for holding a magnet. As can be seen in FIG. 3, pocket 52 is shown in a medial position between left and right hems of the panel 40 proximate the binding 46. Pockets 54 and 55 are shown in a medial location between the top and bottom of the panel 40 proximate the binding 46. Accordingly, pockets 52, 54 and 55 may be referred to as medial pockets. Turning now to FIG. 5, an exemplary medial pocket 54 is shown. The medial pocket 54 includes a pocket panel 54*a* secured to the upper surface 41 of the panel 40, and the magnet 64 inserted therein. As will be discussed below, the medial pockets may have a different size magnet as needed.

The plurality of magnet sets include magnets capable of removable attraction through the thickness of window, or another substrate having thickness typical of a window. In an embodiment, neodymium magnets have been found to provide the strong and sufficient holding power to maintain the shade 40 on the window 20. Magnets should have a pull force of at least 20 lbs. In an embodiment, magnets with a pull force of at least 23 lbs may be used. Other high-strength, high pulling force magnets may be used as the need may arise.

The magnets in each magnet set may have a different size depending on their location in the shade and position on the window 20. The first magnets have a diameter that ranges from 1.0 in (2.54 cm) to 2.0 in (5.08 cm), and a thickness ranging from 0.25 in (0.6 cm) to 0.375 in (0.95 cm). The second magnets have a diameter that ranges from 0.5 in (0.6 cm) to 1.0 in (2.54 cm), and a thickness ranging from 0.25 in (0.6 cm) to 0.5 in (1.27 cm). Returning to FIG. 2, the first magnet 63 is shown having a larger diameter than the second magnet 73. In an exemplary embodiment, the first magnet has a diameter of 1.5 in (3.8 cm), and a thickness of 0.25 in (0.6 cm). In another embodiment, the second magnet has a diameter of 1.0 in. (2.54 cm) and a thickness of 0.5 in (1.3 cm).

The second magnets in the sets may have different sizes depending on their location on the window. The second magnets located in the corners of shade 40 may have a diameter that range from 1.0 in (2.54 cm) to 2.0 in (5.08 cm), and a thickness ranging from 1.0 in (2.54 cm) to 2.0 in (5.08 cm). The other second (or window) magnets may have a diameter that range from 0.5 in (0.6 cm) to 1.0 in (2.54 cm), and a thickness ranging from 0.25 in (0.6 cm) to 0.5 in (1.27 cm). For example, the magnets in the upper corners of the shade 40, e.g., 71 and 73 have a diameter of 1.0 in. (2.54 cm) and a thickness of 0.5 in (1.25 cm). The second magnets in all other locations have a diameter of 1.0 in. (2.54 cm) and a thickness of 0.375 in (0.95 cm).

The selection of the magnet type and size may depending on the weight of the panel and the thickness of the substrate to which the panel is being removable secured to. For example, the panel may include a plurality of magnets that are capable of removably securing a panel having a given weight to a substrate having a thickness. For example, the magnets sets as described above may be used to removably secure a panel to a windshield of a vehicle. However, more magnets, or magnets with a greater pull force may be used if the windshield or substrate thickness is greater than that of a typical window.

Figure 7:
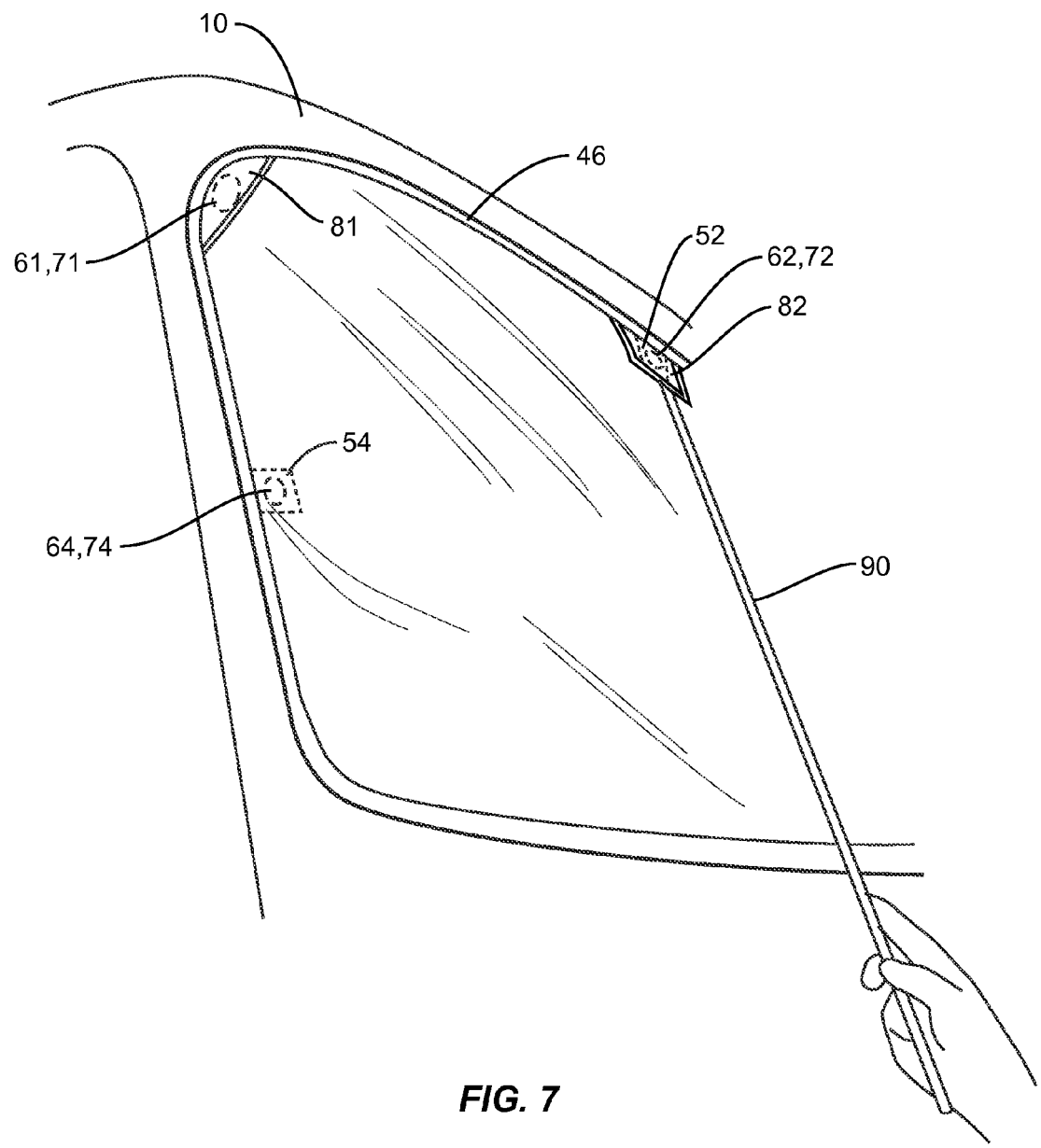
FIG. 7 shows how yet another portion of an exemplary shade is positioned on a window.

Turning now to FIGS. 6, 7, 8 and 9, a method of installing and removing the shade system 30 is shown. Continuing with FIG. 6, the terminal end rod 90 is inserted into the open pocket 81. The rod 90 is then used to position the magnet 61 over the second magnet 71 installed on the window 20. The attraction of the magnets assist in aligning the shade 30 over the window. The magnet 64 in the panel 40 would also align over the magnet 74 located on the opposite surface of the window 20 (not shown). Turning now to FIG. 7, the terminal end of the rod 90 is inserted into the open pocket 82 such that the magnet 62 in the panel pocket 52 is placed over the magnet 72 on the opposite side of the window 20 (not shown).

Figure 8:
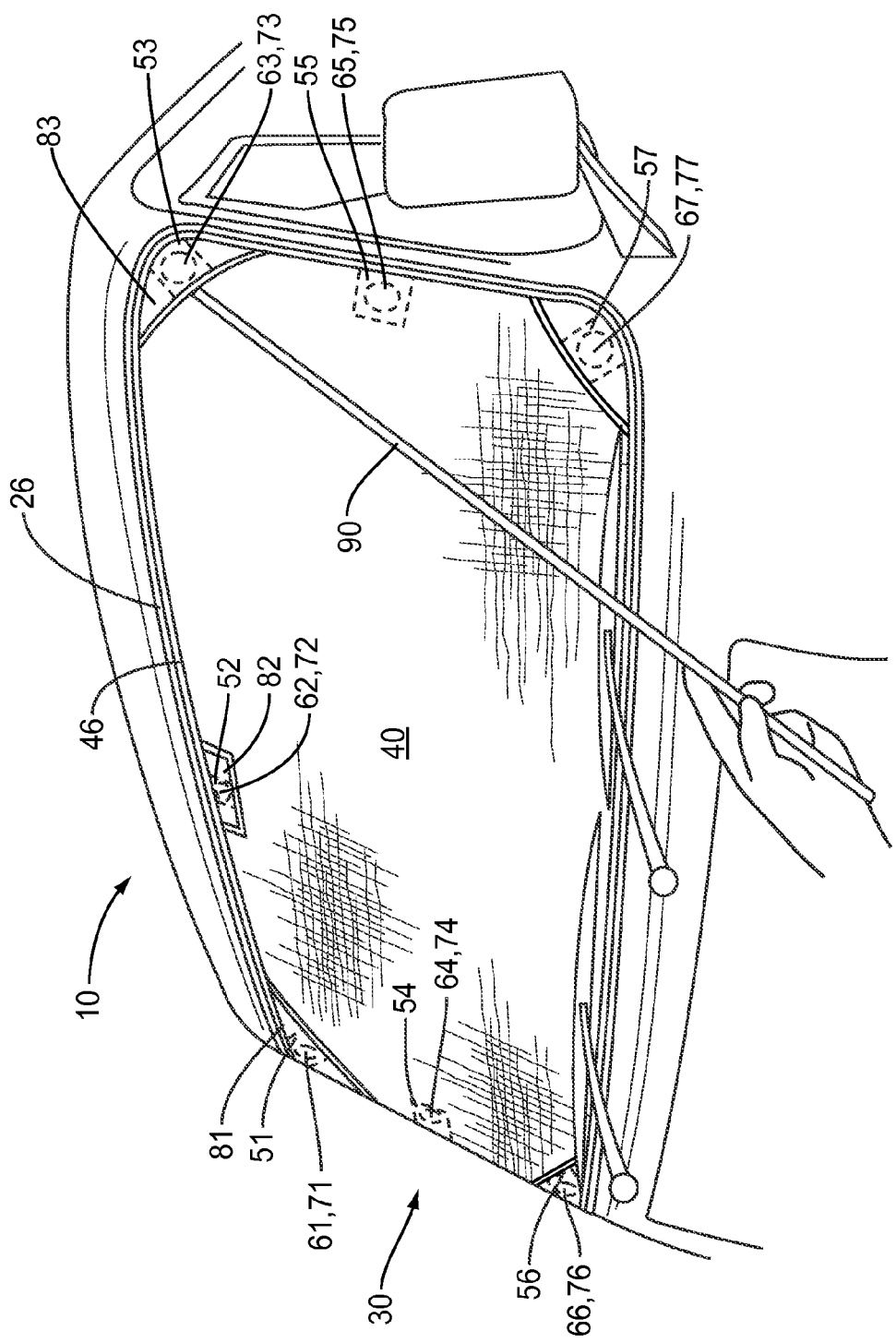
FIG. 8 shows how yet another portion of an exemplary shade is positioned on a window.

Turning now to FIG. 8, the terminal end of the rod 90 is positioned in the open pocket 83 so that the magnet 63 is located over the magnet 73 positioned on the opposite side of the window 20 (element 20 not shown). In the embodiment shown in FIG. 8, the upper edge of the panel 40 aligns the shade 30 within the window gasket 26. The remaining panel magnets 65, 66 and 67 then align and removably secure the panel 40 over magnets 75, 76 and 77, respectively.

Figure 9:
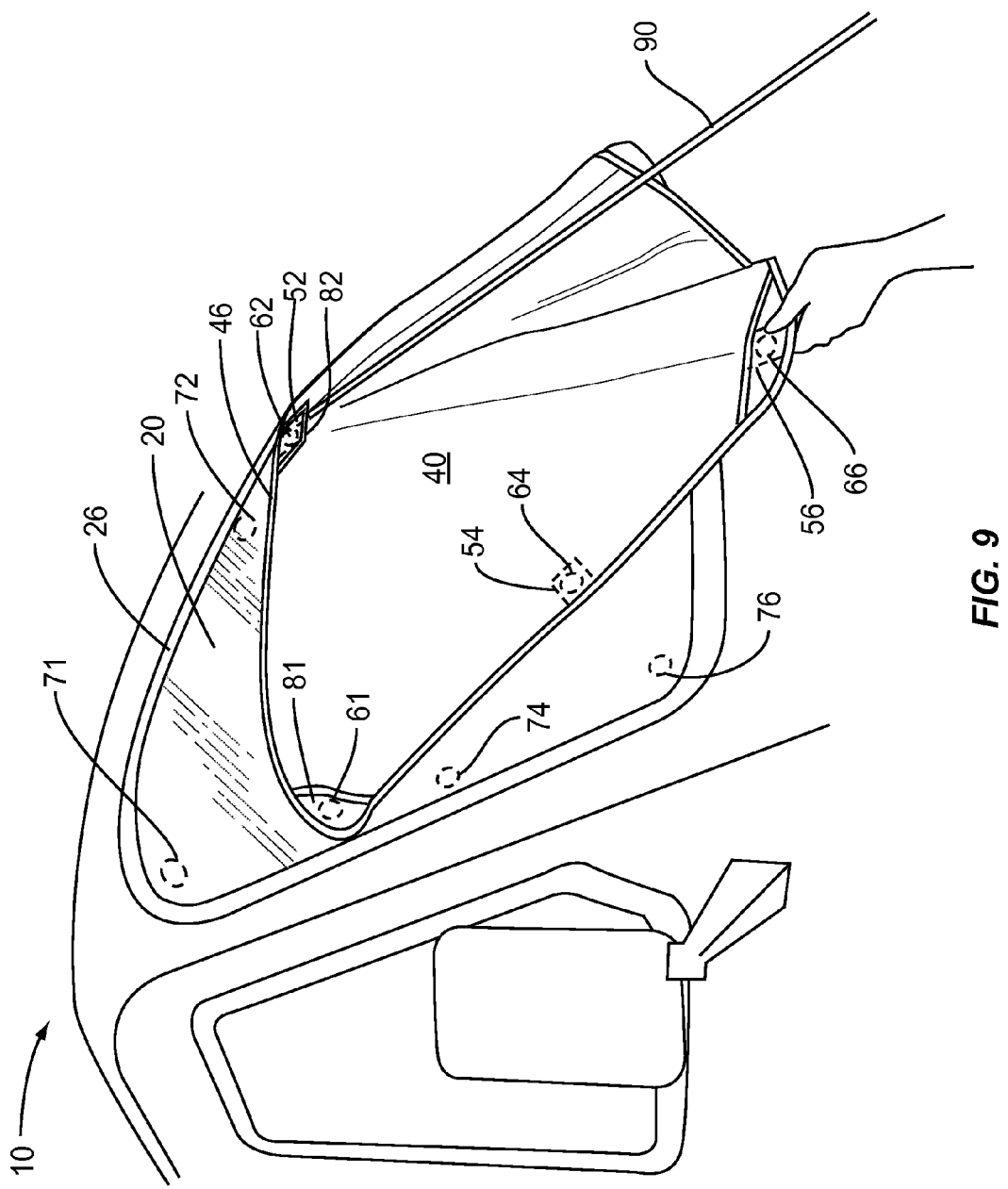
FIG. 9 shows an exemplary shade being removed from the window.

Turning now to FIG. 9, to remove the shade, the panel is lifted off the lower part of the windshield 20, breaking the magnetic attraction of the magnet sets (61, 71), (64, 74), and (66, 76) on the lower half of the shade. The shade 20 may be pulled downward as shown in FIG. 9 breaking the magnetic attraction of the upper magnet sets (62, 72) and (63, 73) (not shown). The shade 30 may then be stored for future use.

Figure 10:
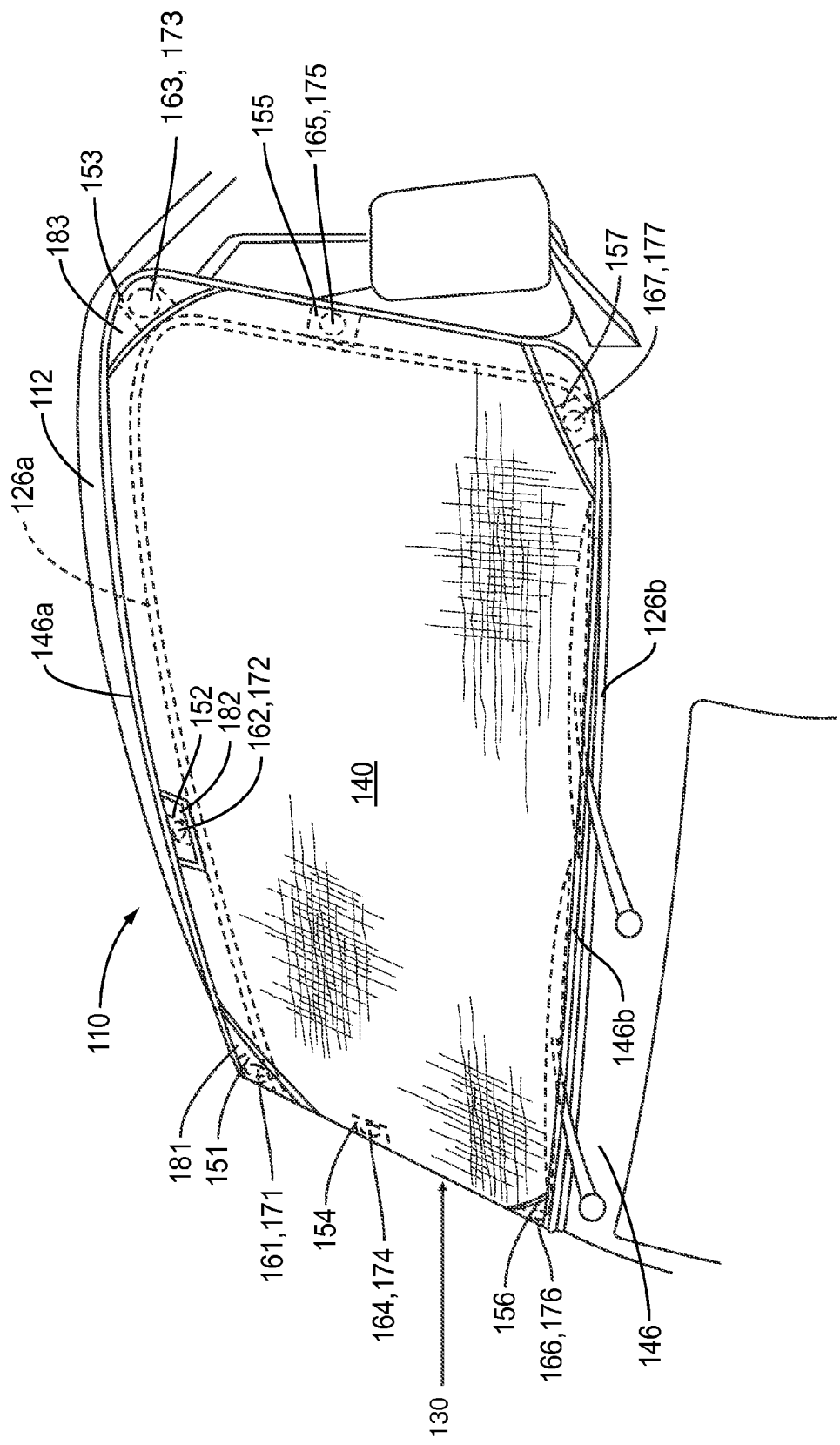
FIG. 10 shows another embodiment of the shade installed on a window.

Turning now to FIG. 10, a second embodiment of the shading system is shown on a vehicle 110. The shading system 130 includes a plurality of pockets 151, 152, 153, 154, 155, 156 and 157. A first set of magnets 161, 162, 163, 164, 165, 166, and 167 is located in the pockets, and at a location that correspond to the location of the second magnets 171, 172, 173, 174, 175, 176, and 177, on the window, respectively. Also included are three open pockets 181, 182 and 183 within which a rod 90 (not shown) is inserted for installation on the vehicle 110.

As shown in FIG. 10, the panel 140 has an upper hem 146a and lower hem 146b. The window has an upper gasket 126a and lower gasket 126b. The upper hem 146a extends above the upper gasket 126a as is depicted. The lower hem 146b is within and just above the lower gasket 126b. Thus, the bottom of the panel 140 is removeably secured to the window itself and the top of the panel 140 is removeably secured to the vehicle cap 112 above the window. The magnets 176 and 177 are secured to the inside surface of the window; the pockets 156 and 157, with magnets 166 and 167 therein, are located on the panel 140 to correspond to the magnets 176 and 177 on the inside surface of the window. Accordingly, in other alternate embodiments, the shade 140 may be used to cover a part of the window. In other alternate embodiments, the shade 140 may be removeably secured to the vehicle itself, i.e., the magnets may be installed in the vehicle body itself, on the underlying structure adjacent the window.

The shading system 30 can be manufactured or customized for any particular window. For example, the shading system 30 can be used for a window of a recreational vehicle as shown, or for a van, truck or other vehicle. The shading system 30 may be used for a windshield, passenger or driver window, or rear windshield. In other embodiments, the shading system may be used to install on the external surface of a building as needed using the same principles as disclosed herein.

In one embodiment of the invention, the method of making a shading system for a window includes preparing a panel 40 with a perimeter having a size and shape that is similar to the size and shape of the window of the vehicle. Initially, a pattern of a window is prepared that has the same size and shape of the exposed window. The pattern is then selectively marked to indicate where the magnet sets will be located. The size and shape of the pattern, and the magnet locations on the pattern, are then transferred to the panel material using known methods. The panel is then cut accordingly. Next, a first plurality of magnets are added to the panel at selected locations thereon. In an embodiment, the selected locations may be proximate to the perimeter of the panel. One or more installation pockets are sewn into place at the upper portion and corners of the shade. A second set of magnets may be provided for installation at selected locations on the window, or a structure to which the shade will be applied. The location of the second set of magnets will correspond to the location of the first set of magnets on the panel. In alternate embodiments, the second set of magnets may be installed on a vehicle as original equipment. In other embodiments, the magnets may be installed in the window as original equipment.

In an embodiment, the invention includes a method of installing a shading system on a window. Initially, a shading system is provided that includes a panel having a shape and size that covers at least a portion of the window. As discussed above, the panel may include a first plurality of magnets in the panel and a second plurality of magnets for securement to the inside surface of the window. The second plurality of magnets may be installed on the inside surface of a vehicle and at a location that corresponds to the location of the first plurality of magnets located on the panel. In one embodiment, the shade may be temporarily attached to the outside window, and adjusted to fit evenly inside the window gasket. From inside the vehicle, the installer may place the second plurality of magnets against the window for permanent mounting thereon. The magnets on the inside may actually locate themselves to the first plurality of magnets in the panel that is temporarily taped in place on the outside of the vehicle window. Once all of the second magnets on the inside of the window are adjusted so that the panel is wrinkle free and of proper fit, their position on the inside of the window is marked so that they may be secured in place.

In another embodiment, the shade may be used on the tire well of a vehicle. In such an embodiment, the panel may have a size and shade that corresponds to the size and shape of the tire well in a vehicle. The second set of magnets may be installed on the fender proximate the tire well. The first set of magnets may be in the panel. The shade may be placed over the tire well; the first and second magnets removably secure the shade to the vehicle.

Although the present invention has been described with exemplary embodiments, it is to be understood that modifications and variations may be utilized without departing from the spirit and scope of the invention, as those skilled in the art will readily understand. Such modifications and variations are considered to be within the purview and scope of the appended claims and their equivalents.

What is claimed is:

1. A method of installing a shading system on a window of a vehicle, the shading system comprising a panel, at least one open pocket in the panel., a first plurality of magnets in the panel, and a second plurality of magnets, and the method comprising:

adhesively mounting at least one magnet of the second plurality of magnets on an inside surface of the window at a location that corresponds to at least one magnet of the first plurality of magnets, which are in the panel, when the panel is placed over the window; and then installing the panel over the window of the vehicle so that the first and second plurality of magnets removably secure the panel over the window of the vehicle, the installing comprising inserting an end of a rod into the at least one open pocket, using the rod to push the panel upwardly across the window while the end of the rod is in the at least one open pocket of the panel, and then withdrawing the end of the rod from the at least one open pocket of the panel such that the panel remains secured over the window of the vehicle.

2. A method of installing a shading system, the method comprising:

installing a panel on a window of a vehicle, there being a first plurality of magnets in the panel, and there being a second plurality of magnets previously fixedly mounted to an inside surface of the window;

the installing comprising positioning the panel on the window so that the first plurality of magnets in the panel align with the second plurality of magnets previously fixedly mounted to the inside surface of the window, the first and second plurality of magnets removably securing the panel over the window of the vehicle;

the positioning comprising inserting an end of a rod into an open pocket of the panel and using the rod to push the panel upwardly across the window while the end of the rod is in the at least one open pocket; and then withdrawing the end of the rod from the at least one open pocket of the panel such that the panel remains secured over the window of the vehicle.

* * * * *